United States Patent [19]

Estes et al.

[11] Patent Number: 4,694,511
[45] Date of Patent: Sep. 22, 1987

[54] COMBINATION GARMENT AND PROTECTIVE SEAT COVER

[76] Inventors: Donna L. Estes, 8430 Franklyn Ave., Los Angeles, Calif. 90069; Carol A. Hilson, 464 Thirty Fourth St., Manhattan Beach, Calif. 90266

[21] Appl. No.: 873,967

[22] Filed: Jun. 13, 1986

[51] Int. Cl.$^4$ ...................... A41D 23/00; A47C 27/00
[52] U.S. Cl. .......................................... 2/69; 297/225; 297/229; 2/67; D2/36; D2/40
[58] Field of Search ................. 2/69, 67, 72; 297/225, 297/229; D2/36, 40

[56] References Cited

U.S. PATENT DOCUMENTS

| | | | |
|---|---|---|---|
| 599,408 | 2/1898 | Uppercu | 2/67 |
| 1,538,538 | 5/1925 | Wood | 297/299 |
| 1,861,455 | 6/1932 | Schwartz . | |
| 1,970,820 | 8/1934 | Schoellkobf . | |
| 2,412,502 | 12/1946 | Garrison | 2/67 |
| 2,469,520 | 5/1949 | Roberts, Jr. | 297/225 |
| 2,567,442 | 9/1951 | Mitchell | 2/67 |
| 2,619,156 | 11/1952 | Seaman . | |
| 2,652,183 | 9/1953 | Hlivka | 297/229 |
| 3,176,315 | 4/1965 | Freund | 2/69 |
| 3,371,957 | 3/1968 | Cook . | |
| 3,695,692 | 10/1972 | Williams . | |
| 3,841,700 | 10/1974 | Beek . | |
| 4,019,776 | 4/1977 | Takamatsu . | |
| 4,047,756 | 9/1977 | Marshall . | |
| 4,232,898 | 11/1980 | Bodrero . | |
| 4,273,380 | 6/1981 | Silvestri | 297/229 X |
| 4,400,030 | 8/1983 | Maruzzo . | |

FOREIGN PATENT DOCUMENTS 1100158  9/1955  France ................................ 297/229

Primary Examiner—Louis K. Rimrodt
Assistant Examiner—J. L. Olds
Attorney, Agent, or Firm—Christie, Parker & Hale

[57] ABSTRACT

Disclosed is a versatile article of manufacture for use by persons engaged in recreational activities such as those associated with the beach. The article, typically made of fabric, has a tubular upper half attached to a depending panel equipped with ties or fasteners. The upper end of the tubular portion has a central opening between a pair of corner openings rendering the article selectively usable as a garment for a person wearing a bathing suit, as a protective cover for a vehicle seat while occupied by bathers en route to and from the beach, and as a cover for a beach chair. The tubular portion of the article may be imprinted with designs on both the back and the front sides and worn with either design facing forwardly.

27 Claims, 7 Drawing Figures

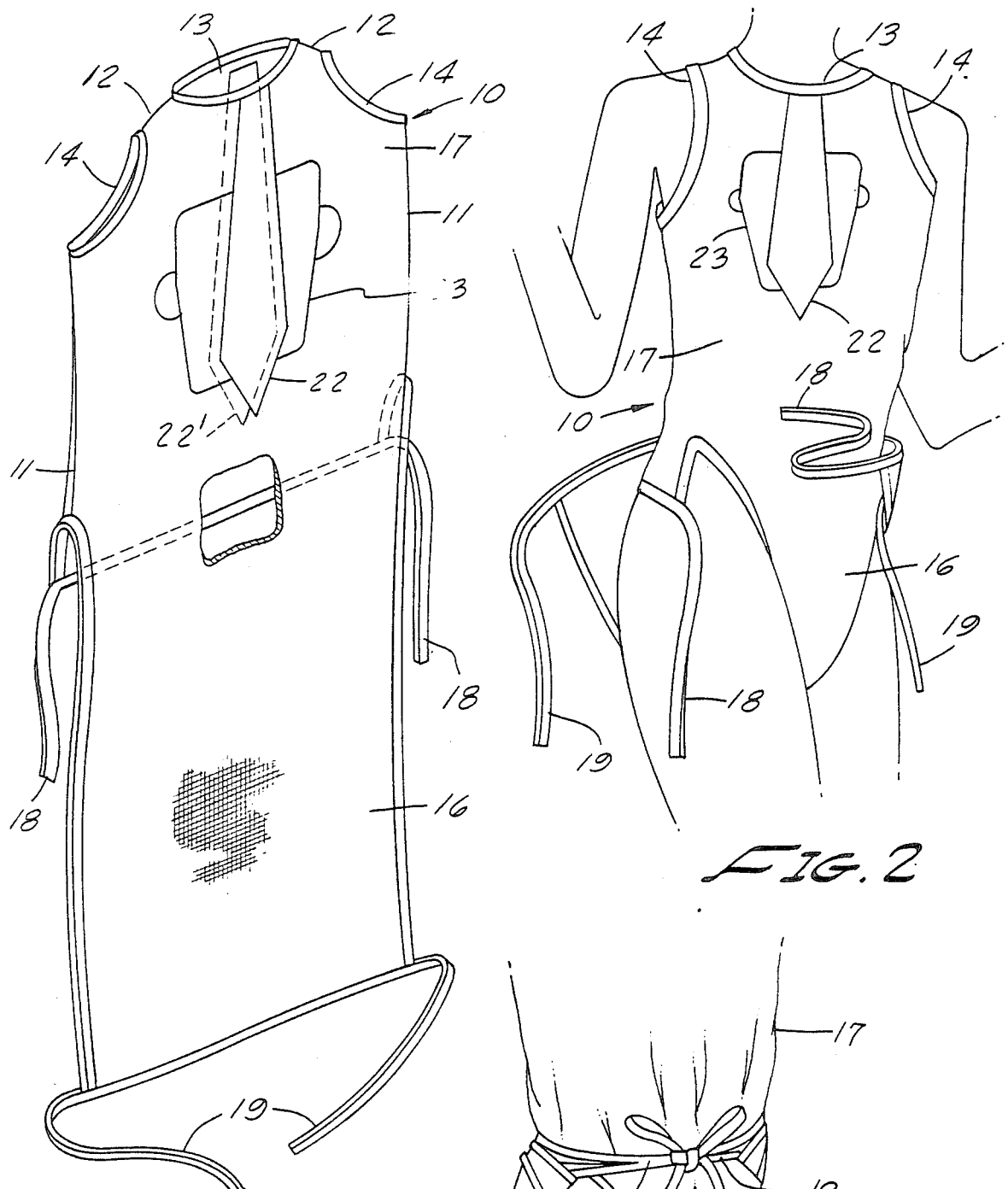
FIG.1
FIG.2
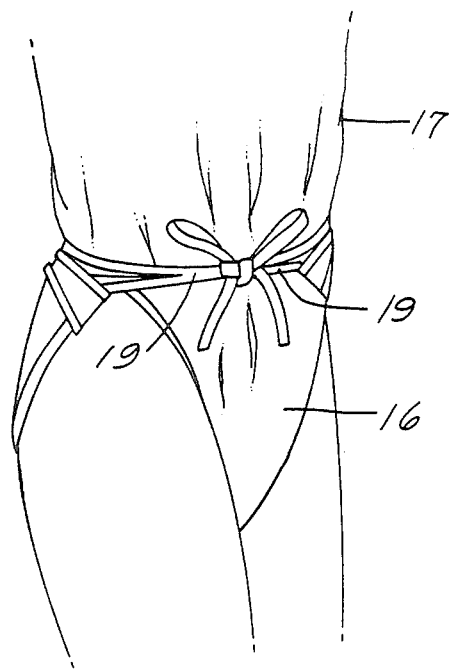
FIG.3

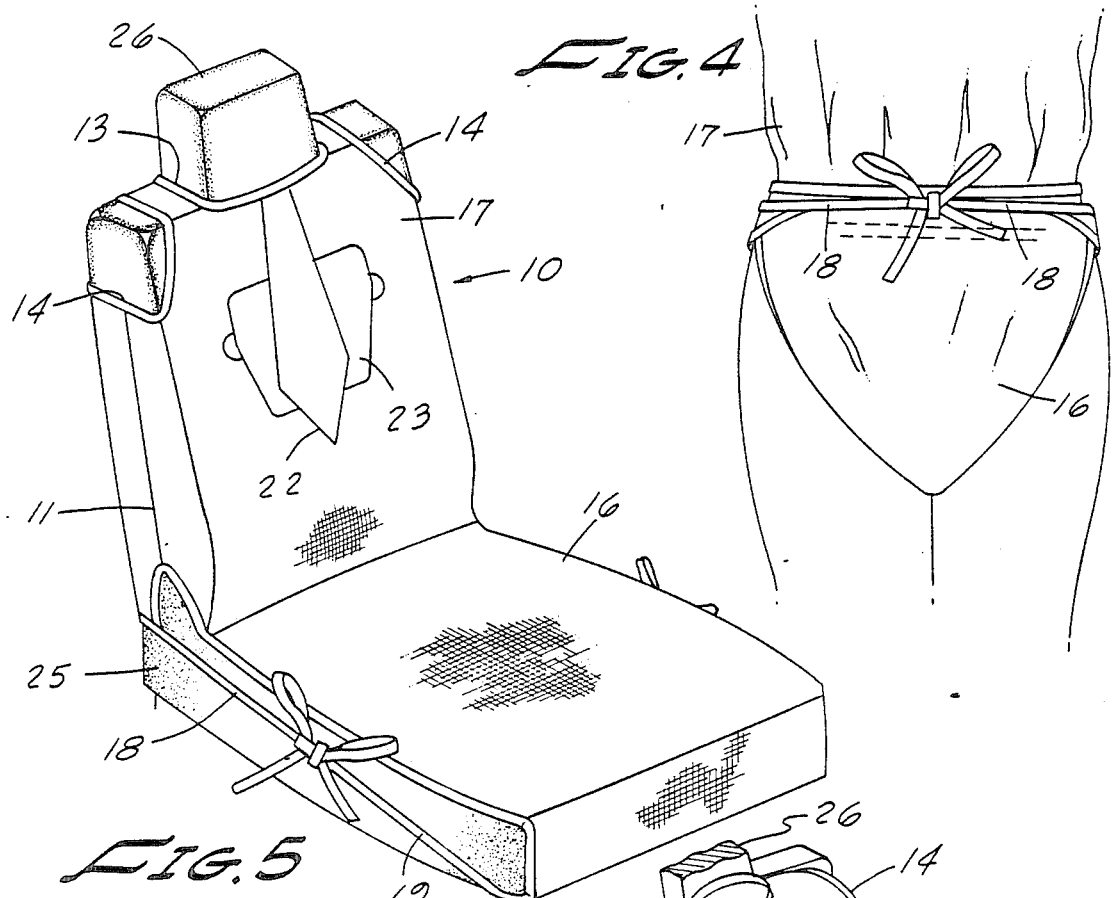

COMBINATION GARMENT AND PROTECTIVE SEAT COVER

This invention relates to an article of manufacture, and more particularly to a combination garment for bathers en route to and from the beach and as a protective cover for a vehicle seat while occupied by a bather or as a cover for a beach chair.

BACKGROUND OF THE INVENTION

Persons planning to visit the beach oftentimes prefer to don bathing suits at home and then drive to the beach. This presents a problem in that there is need for protecting the vehicle seat from perspiration, sun protective lotions and the like as well as providing simple means for covering the body before reaching the beach. Likewise there is a need for providing similar protection against soiling and discoloring beach chairs. Various makeshift expedients have been resorted to to avoid the undesirable consequences and typically involving towelling draped over the vehicle seat. This provides a false sense of security since towelling has no means for securing the same to the seat. Moreover the headrest commonly present in modern vehicle seats presents problems including obscuring the rear view of traffic if covered by makeshift cover expedients.

SUMMARY OF THE INVENTION

In view of the foregoing, there is provided by this invention a unique and versatile article of manufacture selectively usable as a temporary protective cover for the car seat, as an article of wearing apparel for lightly clad bathers and the like, and as a protective beach seat cover.

In an illustrative embodiment the article is a unitary item made from fabric having a tubular upper end and a long panel attached to the lower end of one side thereof. The overturned upper end has a central opening adapted to receive the wearer's head or the headrest of a vehicle seat and a pair of corner openings sized to receive the wearer's arms or the upper corners of a seat back rest. Ties or fasteners are provided to facilitate the securement of the article to a seat or wrapped snugly about the lower end of the torso when worn as a garment. Preferably the tubular portion is provided with at least one design and desirably a pair of designs one of which is located on the exterior of the front half and the other on the interior of the back half. This renders the article reversible so that either design may be displayed on the front side by turning the garment inside out and rotating it through half revolution to present the selected design on the front side of the article. The designs may be identical or different.

Accordingly, it is a primary object of this invention to provide an article of manufacture selectively usable as a article of wearing apparel and as a protective seat cover.

Another object of the invention is the provision of a unitary article of manufacture having a tubular end portion provided with openings at one end disposed and sized to accommodate a wearer's head and arms and suitable for embracing the torso and having a panel attached to the lower end of the tubular portion suitable for embracng the buttocks and pelvic area when wrapped thereabout and also usable when in extended condition to cover and protect a seat occupied by the user of the article.

Another object of the invention is the provision of a reversible garment having a tubular portion sized to embrace the torso and having a design at least on the front side and preferably on the back side and adapted to be worn with either design outermost.

Another object of the invention is the provision of a temporary protective cover for a back-equipped seat including a tubular upper portion having three openings across the upper end thereof respectively accommodating the headrest of a vehicle seat and the upper corners of the seat back rest together with a panel extending from the bottom of the tubular portion sufficient to cover and protect the seat proper.

Another object of the invention is the provision of a unitary article of manufacture having a tubular portion adapted to be temporarily assembled over the back of a vehicle seat and including an attached panel sized to cover the seat portion of the vehicle seat and including fastening means for holding the cover temporarily in place thereby to protect the vehicle seat from soiling by suntan lotions, preparations and the like associated with scantily clad bathers using a vehicle en route to and from the beach.

These and other more specific objects will appear upon reading the following specification and claims and upon considering in connection therewith the attached drawing to which they relate.

Referring now to the drawing in which a preferred embodiment of the invention is illustrated:

FIG. 1 is a front perspective view of an illustrative embodiment of the invention article with portions of the front area cut away to show details rearwardly thereof;

FIG. 2 is a view of the article shown in FIG. 1 in the process of asembly to a person;

FIG. 3 is a fragmentary view similar to FIG. 2 showing the fasteners in place;

FIG. 4 is a view similar to FIG. 3 as viewed from the rear;

FIG. 5 is a perspective view of the article shown in FIG. 1 assembled to a vehicle seat;

FIG. 6 is a view of the article shown in FIG. 1 assembled to a beach chair; and

FIG. 7 is a view of the FIG. 1 article turned 180 degrees and shown as though worn by a person occupying a vehicle seat with the panel outstretched and covering the seat.

Referring more particularly initially to FIG. 1, there is shown an illustrative embodiment of the reversible article of manufacture designated generally 10. The article is formed of suitable sheet material such as a stretch fabric. It is formed from an elongated strip of this material with one end folded over with its lateral edges attached to the juxtaposed lateral edges of the main body along the seams 11, 11 thereby forming a tubular main body. The transverse fold 12 at the upper end is tailored to provide a central opening 13 between a pair of corner openings 14, 14. Opening 13 is large enough for assembly over the head of a person and openings 14, 14 are large enough to receive a person's arms. Each of these openings may be provided with an overturned finishing strip suitably stitched or otherwise secured in place. The remainder of the main body comprises an elongated panel 16 forming an extension of one side of the tubular portion 17. Panel 16 has a length adequate for embracing the crotch and buttocks of a wearer and also long enough to cover and be draped over the forward end of a vehicle or otehr seat such as a beach chair.

Article 10 includes suitable fastening means for securing the lower end of the tubular portion as well as the attached panel 16 to either the person or a seat in a manner now to be described. For example, the lower corners of the rear side of the tubular portion may be equipped with a pair of long straps 18 and the lower corners of panel 16 may be equipped with similar tie straps 19. A person clad in swimming wear and ready to depart for the beach can don article 10 as shown in FIGS. 2, 3 and 4. Ties 18, 18 are wrapped about the lower portion of the torso and tied in the rear as shown in FIG. 4. Thereafter panel 16 is wrapped rearwardly about the crotch and buttocks following which ties 19, 19 are wraped forwardly about the abdomen and tied as shown in FIG. 3.

Preferably, the exterior of the front of tubular portion 17 is imprinted with a design such as a simulated neck tie 22 and an associated design 23 if desired. Since the article can be rotated, it may be worn as shown in either FIG. 1 or in FIG. 7. For this purpose the back portion may be imprinted with any suitable design such as the neck tie 22' (FIG. 1) for display when worn as shown in FIG. 7. An alternate mode of utilizing article 10 is illustrated in FIG. 5, wherein the article is shown assembled to a vehicle seat 25 having a back rest provided with a head rest 26. As is made clear in FIG. 5, the central opening 13 embraces the base of head rest 26 and the upper corners of the seat backrest project through openings 14, 14 and aid in holding the seat cover snugly in place. Ties 18 are tied rearwardly of panel 16 following which this panel is draped forwardly over the seat and about its forward edge whereupon tie members 18 and 19 along one side of the seat may be secured together and the corresponding ties on the opposite side of the seat likewise tied to secure the seat protector 10 firmly in place temporariliy while the bather is en route to and from the beach.

Once at the beach the invention article is readily detached and assembled about a beach chair 28 similarly to the assembly mode described above in connection with FIG. 5.

Following a sojourn at the beach, the owner may elect to use the article as a body covering while returning home, while at the same time utilizing it as a protector for the vehicle seat fabric. This dual objective can be served in the manner indicated in FIG. 7. The garment is rotated 180 degrees and donned to display the design 22' across the front of the wearer. Straps 18, 18 will then emanate from the lower forward corners of the trunks of the article and panel 16 will be suspended from the rear of the trunk. Ties 18, 18 are tied across the back of the wearer and panel 16 is pulled forwardly through the crotch and wrapped about the abdomen and secured similarly to the manner described above in connection with FIGS. 1 to 3. The wearer is then suitably garbed to go to the parking lot or do errands. While occupying the vehicle seat, ties 19 for panel 16 may be untied so that panel 16 will cover the entire seating surface of the vehicle seat and drape across its forward edge. All portions of the seat are then protected from contact with the wearer's skin or with sun lotions or other ointments. Neither these nor the wearer's perspiration can soil the vehicle seat. Upon arrival at a destination, the wearer can reassemble panel 16 about the buttocks and crotch before or immediately upon exit from the vehicle to resume a properly garbed condition.

While the particular combination garment and protective seat cover herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. An article of manufacture for selective use either as a temporary protective cover for a head-rest equipped vehicle seat or as a garment for use by swimsuit clad persons while in transit to and from the beach, the article comprising:

a unitary piece of a flexible sheet-like fabric material having (a) an elongated tubular upper portion of substantially uniform diameter, and (b) an attached essentially rectangularly shaped lower panel depending from approximately one-half the girth of one end of the tubular upper portion, the other end of the tubular upper portion being closed except for a central opening and a pair of corner openings, the central opening being large enough for assembly over the head-rest of the vehicle seat, the pair of corner openings being adapted to fit about the upper corners of the seat back of the vehicle seat, the tubular upper portion being sized to substantially embrace and enclose the seat back of the vehicle seat, the lower panel being sufficiently long and wide to substantially cover the entire seating surface of said vehicle seat when outstretched over the seating surface, and fastener means on the lower panel for securing said article to the vehicle seat to protect the seat from staining and to prevent direct contact between the seat and persons seated thereon in swimsuit wearing apparel enroute to and from the beach, the article also being adapted for being selectively worn as a garment when removed from the vehicle seat, the large central opening and the corner openings providing head and arm-receiving openings when the tubular upper portion is worn on the person's upper torso, and in which the lower panel is large enough to be wrapped around the front and rear sides of the lower torso and secured thereto by the fastener means.

2. An article according to claim 1 in which the corner openings lie generally in planes converging toward one another in a direction away from the lower panel.

3. An article according to claim 1 in which the corner openings are laterally spaced apart from the outer boundary of the large central opening.

4. An article according to claim 1 in which the lower panel has a width substantially the same as the diameter of the tubular upper portion of the article, and said width extends substantially continuously from one end of the lower panel to the other.

5. An article according to claim 1 in which the fastener means are located adjacent opposite sides of the free end of the lower panel.

6. An article according to claim 1 in which the fastener means comprise elongated flexible ties.

7. An article according to claim 1 in which the fastener means are located on opposite sides of the free end of the lower panel and on opposite sides of the end of the tubular upper portion adjacent the lower panel.

8. An article according to claim 1 including a design imprinted on the tubular upper portion of the article on the same side as the panel so the design can be exposed to the front side of the person wearing the article.

9. An article according to claim 1 in which the diameter of the large central opening is substantially less than the uniform diameter of the tubular upper portion.

10. An article according to claim 1 in which the lower panel is substantially wider from one end to the other than the diameter of the central opening.

11. An article according to claim 1 in which the flexible sheet-like fabric material comprises a stretch fabric.

12. An article of manufacture for selective assembly to a portable seat and to a heat-rest equipped vehicle seat to prevent same from straining and to prevent direct contact between the seat and persons seated thereon in swimsuit wearing apparel enroute to and from the beach, the article comprising:

a unitary piece of a flexible sheet-like fabric material having (a) an elongated tubular upper portion of substantially uniform diameter, and (b) an attached essentially rectangularly-shaped lower panel depending from approximately one-half the girth of one end of the tubular upper portion, the other end of the tubular upper portion being closed except for a central opening large enough for assembly over the head-rest of the vehicle seat, the tubular upper portion being sized to substantially embrace and enclose the seat back of the vehicle seat on the portable seat, the lower panel being sufficiently long and wide to substantially cover the entire seating surface of the vehicle seat or the portable seat when outstretched over the seating surface, and fastener means on the lower panel for securing said article to the vehicle seat or to the portable seat.

13. An article according to claim 12 in which the fastener means comprise flexible ties located adjacent opposite sides of the free end of the lower panel.

14. An article according to claim 12 in which the fastener means comprise flexible ties located on opposite sides of the free end of the lower panel and on opposite sides of the end of the tubular upper portion adjacent the lower panel.

15. An article according to claim 12 in which the flexible sheet-like fabric material comprises a stretch fabric.

16. In a motor vehicle, the improvement comprising, in combination:

a vehicle seat having a seat back, a head-rest on the seat back, and a seating surface on which a rider can be seated, a temporary protective cover for the vehicle seat, comprising a unitary piece of a flexible sheet-like fabric material having (a) an elongated tubular upper portion of substantially uniform diameter and (b) an attached essentially rectangularly-shaped lower panel depending from approximately one-half the girth of one end of the tubular upper portion, the other end of the tubular upper portion being closed except for a central opening and a pair of corner openings, the central opening being large enough for assembly of the tubular upper portion over the head-rest of the vehicle seat, the corner openings being adapted to fit over upper corners of the seat back, the upper portion being sized to substantially embrace and enclose the seat back of the vehicle seat, the lower panel being sufficiently long and wide to cover substantially the entire seating surface of the vehicle seat when outstretched over the seating surface, and fastening means on the lower panel for securing the protective cover to the vehicle seat to protect the seat from staining and to prevent direct contact between the seat and persons seated thereon in swimsuit wearing apparel enroute to and from the beach, the temporary protective cover also being adapted to be selectively worn as a garment when removed from the vehicle seat, the large central opening and the corner openings being sized to provide head and arm-receiving openings when the tubular upper portion is worn on the upper torso, the lower panel being sufficiently large to be wrapped around the front and rear sides of the lower torso and secured thereto by the fastening means.

17. The combination according to claim 16 in which the lower panel has a width substantially the same as the diameter of the tubular upper portion substantially continuously from one end of the lower panel to the other.

18. The combination according to claim 16 in which the fastener means are located adjacent opposite sides of the free end of the lower panel.

19. The combination according to claim 16 in which the fastener means are on opposite sides of the free end of the panel and on opposite sides of the end of the tubular upper portion adjacent the lower panel.

20. The combination according to claim 16 in which the diameter of the large central opening is substantially less than the uniform diameter of the tubular upper portion.

21. The combination according to claim 16 in which the lower panel is substantially wider, from one end to the other, than the diameter of the central opening; and the lower panel is approximately as wide as the diameter of the tubular upper portion substantially continuously from one end of the lower panel to the other.

22. The combination according to claim 16 in which the flexible sheet-like fabric material comprises a stretch fabric.

23. In a motor vehicle, the improvement comprising, in combination:

a vehicle seat having a seat back, a head-rest on the seat back, and a seating surface on which a rider can be seated, a temporary protective cover for the vehicle seat, comprising a unitary piece of a flexible sheet-like stretch fabric material having (a) an elongated tubular upper portion of substantially uniform diameter and (b) an attached essentially rectangular-shaped lower panel depending from approximately one-half the girth of one end of the tubular upper portion, the other end of the tubular upper portion being closed except for a central opening large enough for assembly over the head-rest of the vehicle seat, the tubular upper portion being sized to be stretched so as to substantially embrace and enclose the seat back of the vehicle seat, the lower panel being sufficiently long and wide to cover substantially the entire seating surface of the vehicle seat when outstretched over the seating surface, and fastener means on the lower panel for securing the protective cover to the vehicle seat to protect the seat from staining and to prevent direct contact between the seat and persons seated thereon in swimsuit wearing apparel enroute to and from the beach.

24. The combination according to claim 23 in which the lower panel has a width substantially the same as the diameter of the tubular upper portion substantially continuously from one end of the panel to the other.

25. The combination according to claim 24 in which the fastener means comprise flexible ties located adjacent opposite sides of the free end of the lower panel and on opposite sides of the end of the tubular upper portion adjacent the lower panel.

26. The combination according to claim 23 in which the diameter of the large central opening is substantially less than the uniform diameter of the tubular upper portion, and in which the lower panel is substantially wider from one end to the other than the diameter of the central opening.

27. The combination according to claim 23 including a design imprinted on the same side of the tubular upper portion to which the lower panel is attached.

* * * * *